(12) United States Patent
McGrew

(10) Patent No.: X9199
(45) Date of Patent: Oct. 27, 1835

(54) AIR, CONDENSED, FOR PROPELLING BOATS, CARS, & C.

(76) Inventor: Alexander McGrew

Alexander McGrew, of Cincinnati, Ohio
Letters Patent

The schedule referred to in these Letters Patent and making part of the same, containing a description in the words of the said Alexander McGrew himself, of his improvement in the propelling cars, boats &c. by means of condensed air.

---

To all whom it may concern - Be it known that I Alexander McGrew of Cincinnati, in the County of Hamilton and State of Ohio, have invented or discovered a more economical mode of obtaining power for propelling cars upon rail-roads, boats upon rivers and canals, and effecting other objects where such power may be wanted for the purposes of transportation, than has heretofore been adopted; and I do hereby declare that the following is a full and exact description thereof - My improvement does not consist in the employment of any newly invented machinery, but in the using of such power from falls or currents of water or other natural or artificial sources of power as has heretofore been allowed to run to waste, and employing the same for the purpose of condensing air into suitable receivers: the elastic force of which condensed air is to be subsequently applied to the purposes herein designated - In numerous situations in the courses of canals and rail-roads and of other roads and water courses, there are falls of water, waste weirs, dams, sluices &c. the power from which if economized would be ample for the attainment of all the ends proposed by me - I bring this into use by taking the waste power from wheels or other machinery already erected or by erecting others where they do not already exist, using any of the known constructions of such wheels, or other machinery, as may be best adapted to the particular situations in which they are to be employed. These I connect in the ordinary way, with the piston or pistons of condensing Engines, constructed for the condensing of air & force air thereby into suitable receptacles, or reservoirs, furnished with the requisite tubes valves, or other appendages, by which they are adapted to the containing of the air thus condensed, and to the supplying of the same in measured quantities, so as to operate upon a piston for driving propelling machinery as high steam is now made to operate - The means of doing this does not require any description being perfectly familiar to competent Engineers - The air is to be condensed into one large stationary reservoir and by means of a connecting tube and stop cock transferred therefrom into other reservoirs connected with the vehicle to be propelled. What I claim as my improvement in the art of propelling cars, boats, or other vehicles for transportation, is the employment of the waste power of water, wind or other natural or artificial sources of power to the condensation of air in the manner and for the purposes herein before set forth.

Witnesses
R. G. Campbell
J. Lettinning

Alex. McGrew

Exd.
[illegible]

[518 wds